United States Patent
Andersson et al.

(10) Patent No.: US 10,907,803 B2
(45) Date of Patent: Feb. 2, 2021

(54) VEHICLE LAMP ASSEMBLY

(71) Applicant: Volvo Car Corporation, Gothenburg (SE)

(72) Inventors: Markus Andersson, Gothenburg (SE); Anders Lennartsson, Gothenburg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/363,092

(22) Filed: Mar. 25, 2019

(65) Prior Publication Data
US 2020/0309353 A1    Oct. 1, 2020

(51) Int. Cl.

| | |
|---|---|
| *F21V 17/00* | (2006.01) |
| *F21V 15/01* | (2006.01) |
| *F21S 43/27* | (2018.01) |
| *F21V 23/06* | (2006.01) |
| *B60Q 3/88* | (2017.01) |
| *B60Q 1/00* | (2006.01) |
| *B60Q 3/51* | (2017.01) |
| *B60Q 3/60* | (2017.01) |

(52) U.S. Cl.
CPC ............ *F21V 17/002* (2013.01); *B60Q 1/007* (2013.01); *B60Q 1/0088* (2013.01); *B60Q 3/51* (2017.02); *B60Q 3/60* (2017.02); *B60Q 3/88* (2017.02); *F21S 43/27* (2018.01); *F21V 15/01* (2013.01); *F21V 23/06* (2013.01)

(58) Field of Classification Search
CPC ........ F21V 17/002; F21V 15/01; F21V 23/06; B60Q 3/51; B60Q 3/88; B60Q 3/60; B60Q 1/007; B60Q 1/0088; F21S 43/27
See application file for complete search history.

(56) References Cited

U.S. PATENT DOCUMENTS

| | | | |
|---|---|---|---|
| 9,239,136 B1* | 1/2016 | Petersen | H01R 13/62 |
| 2005/0017479 A1 | 8/2005 | Bynum | |
| 2007/0183156 A1* | 8/2007 | Shan | F21V 29/70 |
| | | | 362/277 |
| 2010/0053947 A1 | 3/2010 | Fowler, Jr. et al. | |

(Continued)

FOREIGN PATENT DOCUMENTS

| | | |
|---|---|---|
| CN | 202769559 U | 3/2013 |
| DE | 4133002 C3 | 4/1993 |

(Continued)

*Primary Examiner* — Mary Ellen Bowman
(74) *Attorney, Agent, or Firm* — Clements Bernard Walker; Christopher L. Bernard

(57) ABSTRACT

Lamp assemblies for illuminating interior or exterior spaces of a vehicle are provided. In one implementation, a lamp assembly includes a housing having a frame, the housing being adapted to at least partially cover a light device installed within the housing. Light radiating from the light device passes through an opening in the frame. The lamp assembly further includes a lens adapted to be removably connected to the frame of the housing. When connected to the housing, the lens is adapted to refract the light radiating from the light device through the opening in the frame. When the lens is connected to the frame of the housing, a shortest path between the light device and the lens is defined by a z-axis. The lens may include one or more slide components to allow the lens to slide into or onto the frame along an x-axis that is perpendicular to the z-axis.

20 Claims, 12 Drawing Sheets

(56) References Cited

U.S. PATENT DOCUMENTS

2015/0146444 A1* 5/2015 Ovenshire ............... B60Q 1/56
                                                    362/497
2015/0369441 A1   12/2015 Ovenshire et al.

FOREIGN PATENT DOCUMENTS

EP          0838370 A2    4/1998
EP          1050432 A2   11/2000

* cited by examiner

VEHICLE LAMP ASSEMBLY

TECHNICAL FIELD

The present disclosure is generally directed to the automotive field. More specifically, the present disclosure relates to lamp assemblies adapted to be installed on a vehicle for illuminating interior spaces within or exterior spaces outside of the vehicle.

BACKGROUND

Modern vehicles typically include a plurality of interior and exterior lights that help the driver and passengers to see the interior spaces within or outside of a cabin or trunk of the vehicle. For example, many vehicles will have dome lights, door lights, trunk lights, tailgate lights, floor lights, under-the-dashboard lights, etc., which are designed to be illuminated at certain times, such as when a vehicle door or trunk is open. Thus, when the driver or passengers are entering or leaving the vehicle or when the trunk is opened, the driver and passengers can easily see the interior spaces and even see items such as umbrellas, groceries, luggage, or other things that may be stored in the vehicle. These interior lights are especially useful at night or at other times when the vehicle is in a dark area.

These various types of interior lights are typically designed to include an optical lens that covers an opening of a housing in which one or more light devices reside. When the lens is removed, the light device can be replaced as needed, for example. Conventional interior lamp assemblies may be designed such that the lens can be snapped on or off in a direction essentially toward or away from the opening of the housing of the lamp assembly or toward or away from the light device residing within the lamp assembly housing.

One issue with the conventional lamp assemblies is that when a lens is snapped on, there is a chance that the lens will not be snapped on correctly. For example, if the lens is not snapped on completely, the lens may inadvertently fall off from the housing. Not only might the lens get lost at this time, but also the need to snap the lens back into place again may be an inconvenience for the user. Also, if the lens falls off, the light device, without any filtering effects of the lens, may be too bright for the occupants in the vehicle. Furthermore, if the lens is not snapped on completely or if it is positioned incorrectly on the housing, the lens may be out of alignment with respect to the light device, which may result in the lens being unable to refract light beams in a direction or dispersion pattern according to the designed purpose of the lamp assembly. Finally, the lens may become ill-fitting over time and simply fall off, thereby failing to provide adequate environmental protection for the light device.

Therefore, there is a need in the field of interior lighting systems of vehicles to provide a lamp assembly that eliminates the above-mentioned issues and allows the lens to be connected to the lamp assembly in a predefined arrangement. There is also a need to confirm for the user that a lens of the lamp assembly has been installed correctly without any guesswork.

SUMMARY

Accordingly, a lamp assembly according to one embodiment may include a housing having a frame. The housing may be adapted to at least partially cover a light device installed within the housing, whereby light radiating from the light device passes through an opening in the frame. The lamp assembly may also include a lens adapted to be removably connected to the frame of the housing, such that, when connected to the housing, the lens is adapted to refract the light radiating from the light device through the opening in the frame. More specifically, when the lens is connected to the frame of the housing, a shortest path between the light device and the lens is defined by a z-axis. Also, the lens may further include one or more slide components to allow the lens to slide onto the frame along an x-axis that is perpendicular to the z-axis.

According to another embodiment, a lens is provided such that it is adapted for connection to a housing of a lamp assembly. The lens in this embodiment may include a refraction element adapted for refracting light radiating from a light device installed in the housing of the lamp assembly. The refraction element may be substantially oriented within a plane defined by an x-axis and a y-axis, whereby a shortest path between the light device and the plane is defined by a z-axis that is perpendicular to both the x-axis and the y-axis. The lens may further include one or more connection elements adapted to enable the lens to be removably connected to the housing of the lamp assembly by moving the lens in a connecting direction defined as being substantially within or parallel to the plane.

BRIEF DESCRIPTION OF THE DRAWINGS

The present disclosure is directed to various embodiments illustrated and described herein with reference to the various drawings, in which like reference numbers are used to denote like system or assembly components/methods or algorithm steps. The illustrated components of the various systems are not necessarily drawn to scale.

DESCRIPTION OF EMBODIMENTS

According to the embodiments described in the present disclosure, a lamp assembly may be constructed such that a lens may be attached to the lamp assembly in a certain way such that the lamp assembly can be completely assembled only when the lens is properly connected. Also, the lamp assembly may be constructed such that the lens is connected to the lamp assembly in only one direction. For instance, the lens in some embodiments can be moved in a connecting direction that is perpendicular to an orthogonal direction defining a shortest path between the lens and a light device or other lighting fixture of the lamp assembly.

The structure of the various embodiments of the lamp assembly, as well as the manner in which the parts of the lamp assembly are assembled to form a completed lamp assembly, is described in the present disclosure. The structure and process of assembling the parts, as disclosed herein, do not suffer from the problems of conventional lamp assemblies. Specifically, once the lamp assembly of the present disclosure is assembled, the lens cannot be removed without removing the entire lamp assembly opening the housing. Thus, the lens cannot simply fall off the housing as is common with conventional lamp assemblies.

Also, the lamp assembly of the present disclosure can only be formed in its completed state when the lens is properly positioned. Therefore, not only will the lens of the present disclosure not fall off the housing, but also the lens will not be positioned incorrectly on the lamp assembly causing the lamp assembly to radiate light in unintended or incorrect patterns.

Figure 1:
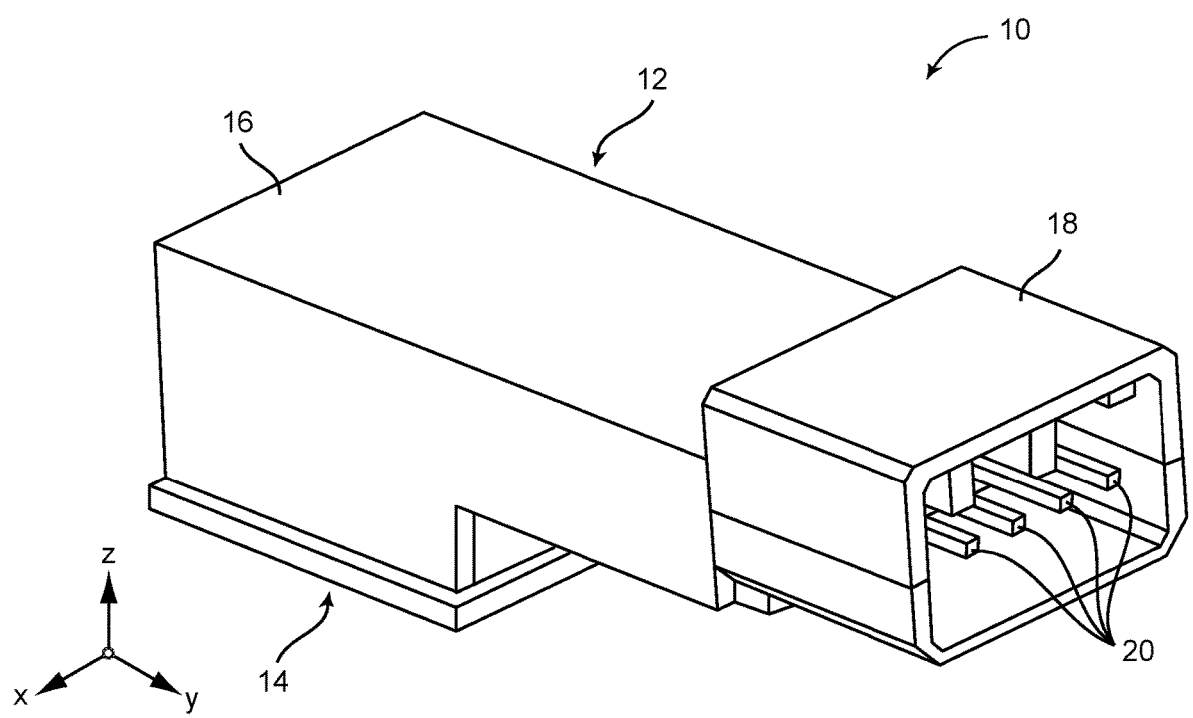
FIG. 1 is a diagram showing a perspective view of a lamp assembly shown in its assembled state, according to one embodiment.
Figure 2:
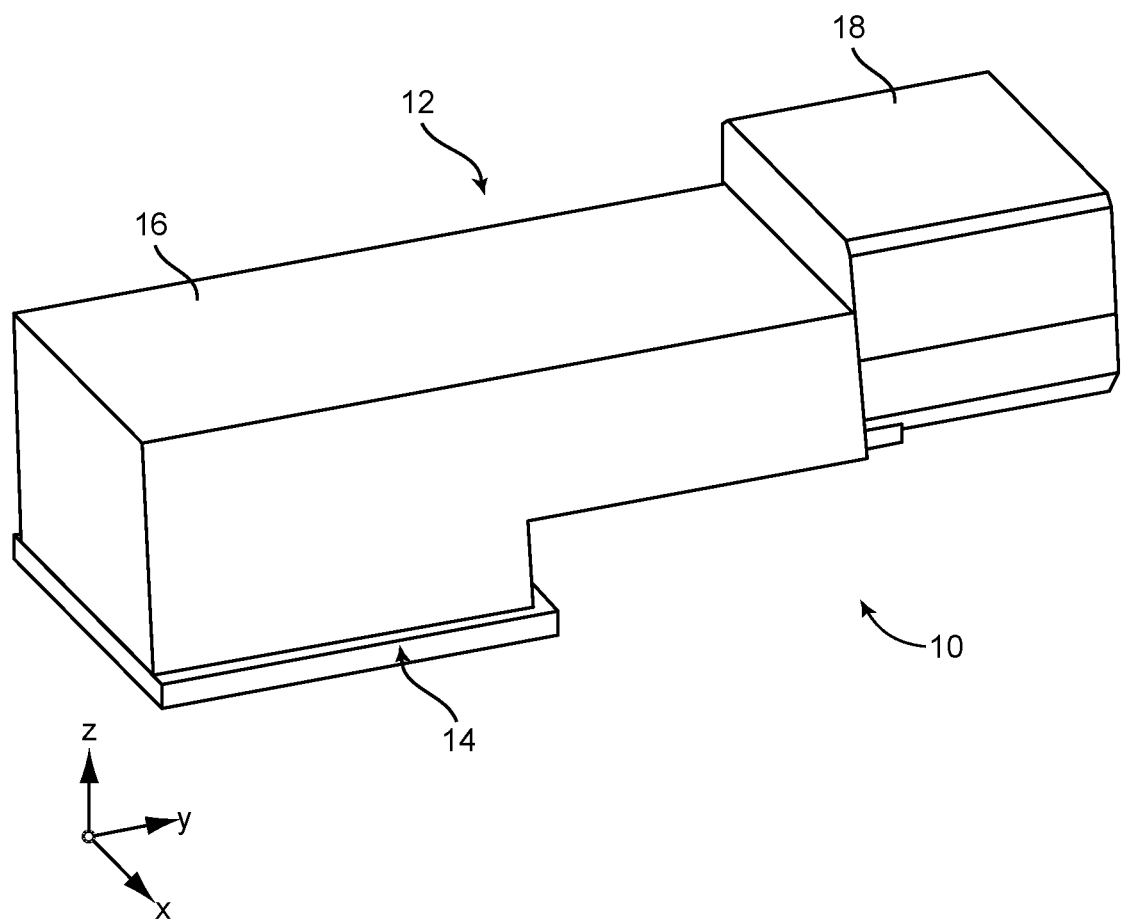
FIG. 2 is a diagram showing another perspective view of the lamp assembly of FIG. 1.
Figure 3:
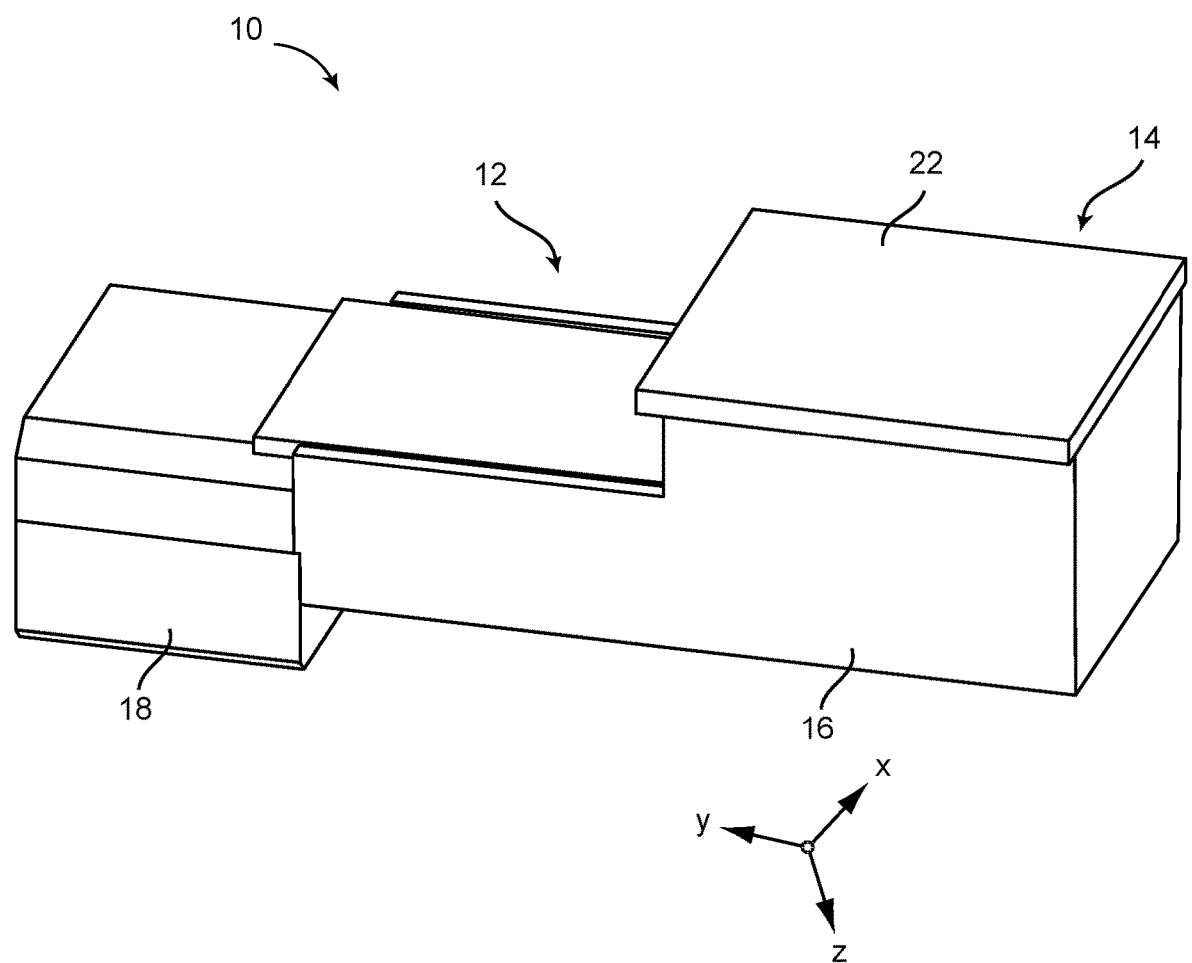
FIG. 3 is a diagram showing a perspective view of a bottom portion of the lamp assembly of FIG. 1.

FIGS. 1-3 are perspective views of an embodiment of a lamp assembly 10 as shown in its completed or assembled form. FIG. 1 is a top front view; FIG. 2 is a top back view; and FIG. 3 is a bottom back view. The lamp assembly 10 in this embodiment includes a housing 12 and a lens 14 supported on the housing 12. The housing 12 includes a body portion 16 and a connector portion 18. The connector portion 18 may include a plug head member that is adapted to surround one or more electrical leads 20.

As also shown in FIGS. 1-3, three-dimensional reference axes are illustrated to help define the structure and assembly of the lamp assembly 10. For example, an x-axis is shown in a direction going from one side of the lamp assembly 10 to the other. A y-axis is shown in a direction going from the back of the lamp assembly 10 (e.g., at the end where the body portion 16 is located) to the front of the lamp assembly 10 (e.g., at the end where the connector portion 18 is located). Also, a z-axis is shown in a direction from a bottom of the lamp assembly 10 to the top. The three axes (i.e., the x-axis, y-axis, and z-axis) are perpendicular to one another.

Although the details of the structure of the lamp assembly 10 may be described in the present disclosure as being oriented or moved along certain axes, it should be understood that certain tolerances may be expected in the structure. Thus, the various parts and/or the movement of the various parts may not be exactly along the stated axes (or parallel to the stated axes) but may instead be substantially close to or substantially parallel with the stated axes. It should also be understood that certain terminology, such as "up," "down," "front," "back," "top," "bottom," etc., as used throughout the present disclosure, may refer to an orientation of the lamp assembly 10 as illustrated in FIGS. 1 and 2.

However, it should further be noted that the lamp assembly 10, according to the various embodiments described in the present disclosure, may instead by oriented in any suitable orientation. For example, the lamp assembly 10 may be positioned at any suitable position within a vehicle and may be directed in any suitable orientation within the vehicle for illuminating various spaces within the interior or trunk of the vehicle.

During assembly, the lens 14 may be slid onto the housing 12 in a first direction (e.g., the x-direction) from one side to the other such that the lens 14 is positioned below the body portion 16 of the housing 12. According to various embodiments, the lamp assembly 10 may be constructed such that an installation direction of the lens 14 may be oriented along or near the x-axis, along or near the y-axis, or along a direction within a plane defined by the x-axis and y-axis or a plane substantially parallel to the plane defined by the x-axis and y-axis. More particularly, the installation direction may be substantially perpendicular to the z-axis, where a shortest distance between the lens 14 and a light device within the housing 12 may be the orthogonal direction defined by the z-axis.

As described in more detail below, the housing 12 includes a lid positioned in such a way that the lid limits movement of the lens 14 in the installation direction (e.g., along the x-axis). The lid can be moved into this locking position after the lens 14 has been properly positioned on the housing 12.

The electrical leads 20 are adapted to receive electrical power from a power source and provide the electrical power to one or more light devices residing within the housing 12. Light beams radiating from the light devices are adapted to radiate through the lens 14, which may be adapted to refract (e.g., disperse, focus, and/or redirect) the light beams in a specific pattern or in multiple directions according to the specific design of the lens 14. The lens 14 includes an outer surface 22, as shown in FIG. 3, which may be directed toward an interior space inside a cabin or trunk of a vehicle where light may be needed, especially for spaces that may normally be dark, particularly at night. Although the outer surface 22 of the lens 14 is shown in FIG. 3 as being relatively planar, it should be understood that the surface 22 in various embodiments may have any pattern of surface characteristics for refracting light in a specific manner. the lens 14 may be defined as a refraction element that is oriented in a plane defined by the x-axis and y-axis.

Figure 4:
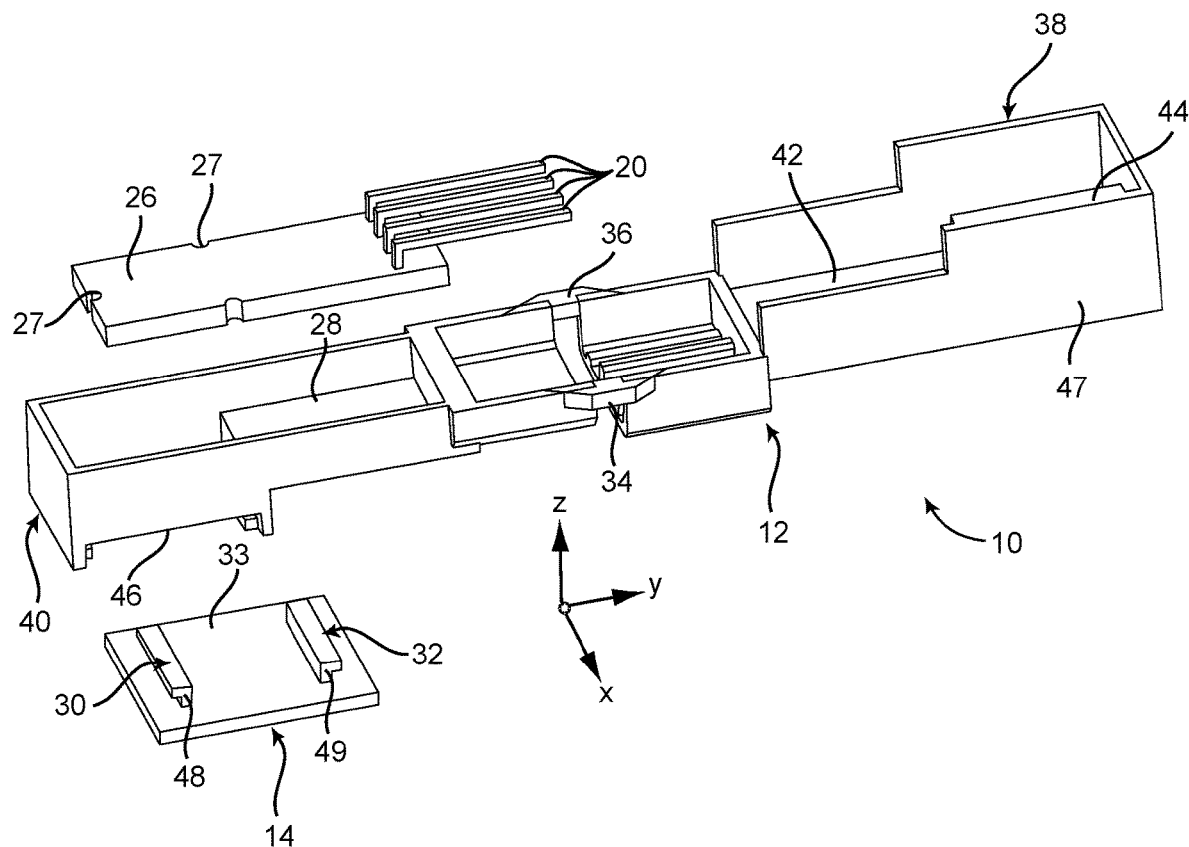
FIG. 4 is a diagram showing an exploded view of the parts of the lamp assembly of FIG. 1 shown in its unassembled state, according to one embodiment.

FIG. 4 is an exploded view of the lamp assembly 10 showing the housing 12 in an opened or unassembled state. In the opened state, a printed circuit board (PCB) 26 can be inserted within the housing 12. One or more light devices (not shown in FIG. 4) may be positioned on an underside of the PCB 26 for radiating light in essentially a downward direction toward the lens 14. The light devices may include any number or type of bulbs or components, such as incandescent type materials, light emitting diodes (LEDs), or other materials or components adapted to provide illumination. In this embodiment, the electrical leads 20 extend from a top surface of the PCB 26. One or more of the electrical leads 20 may be used for receiving electrical power from a power source for powering and illuminating the light devices.

One or more of the electrical leads 20 may also be configured as outputs for transmitting electrical signals from the PCB 26 to an electronic control unit (ECU) or other electrical control circuitry on the vehicle. These output leads may be used for informing the ECU of an operational condition of one or more of the light devices. For example, the PCB 26 may include sensing circuitry for determining if a light device is inoperative and inform the ECU of the inoperative light device via the output leads.

The PCB 26 may also be constructed to include circuit traces, resistors, capacitors, transistors, and other electrical components and circuitry for controlling the voltage to the light devices, sensing the operability of the light devices, and performing other lighting control functions. The electrical circuitry may be adapted to power the lights under certain conditions (e.g., when a vehicle door is open) and/or for a predetermined amount of time after certain events (e.g., after the opening or closing of a vehicle door, after the ignition switch of the vehicle has been turned on or off, etc.).

The PCB 26 may include notches 27 on the edges of the board, where the notches 27 may be aligned with corresponding vertical strips on an inside surface of the housing 12 to allow the PCB 26 to rest in a predetermined position within the housing 12. In some embodiments, a portion of the PCB 26 may rest on a bottom surface 28 of the housing 12.

According to various embodiments, the lens 14, as shown in FIG. 4, may include a first slide component 30 and a second slide component 32 extending from an inner surface 33 of the lens 14. In this embodiment, the slide components 30, 32 may be oriented on the inner surface 33 in a direction substantially parallel with the x-axis. The first and second slide components 30, 32 may be adapted to slide onto rails of the housing 12. For example, the rails may also be arranged in substantially the x-direction and separated from each by a distance corresponding to the dimensions of the slide components 30, 32 to thereby allow the lens 14 to be slidably connected to the housing 12.

As mentioned above, the housing 12 is illustrated in FIG. 4 in its opened state. However, when the PCB 26 and lens 14 are installed on the housing 12, a portion of the housing 12 can be folded or pivoted around a pivot axis defined by living hinges 34, 36 or other suitable pivoting components. The pivot axis may be aligned substantially along the x-axis to enable a lid 38 of the housing 12 to be inserted over the top of a base 40 of the housing 12. The lid 38 may include outside dimensions that are slightly larger than the outside dimensions of the base 40 such that the outer walls of the lid 38 will encompass the outer walls of the base 40. When the lid 38 is pivoted onto the top of the base 40, a surface 42 of the lid 38 may be adapted to rest on an upper portion of the side walls of the base 40 or above the side walls of the base 40 to thereby provide protection for the PCB 26.

The lid 38 may include a locking strip 44 and the base 40 may include a locking edge 46. When the lid 38 is folded onto the base 40, the locking strip 44 may be adapted to lock onto or engage the locking edge 46 to keep the lid 38 in a fixed position on the base 40. Once locked, the locking strip 44 can be disengaged from the locking edge 46 by prying the locking strip 44 away from the locking edge 46.

In this embodiment, the lid 38 may be locked onto the base 40 after the lens 14 has been properly inserted onto the rails of the housing 12 and slid underneath the base 40. The locking strip 42 of the lid 38 and a side wall 47, which is adjacent to the locking strip 44, may be adapted to press against an end 48 of the first slide component 30 of the lens 14 and an end 49 of the second slide component 32. In some embodiments, the side wall 47 of the lid 38 may limit movement of the lens 14 in a reversed direction to prevent the lens 14 from being removed from the base 40.

In some embodiments, the base 40 may be adapted to allow the first and second slide components 30, 32 of the lens 14 to slide onto the rails from either direction along the x-axis. In other embodiments, the base 40 may include an abutment wall that allows the lens 14 to slide onto or off of the rails from only one side of the base 40.

Figure 5:
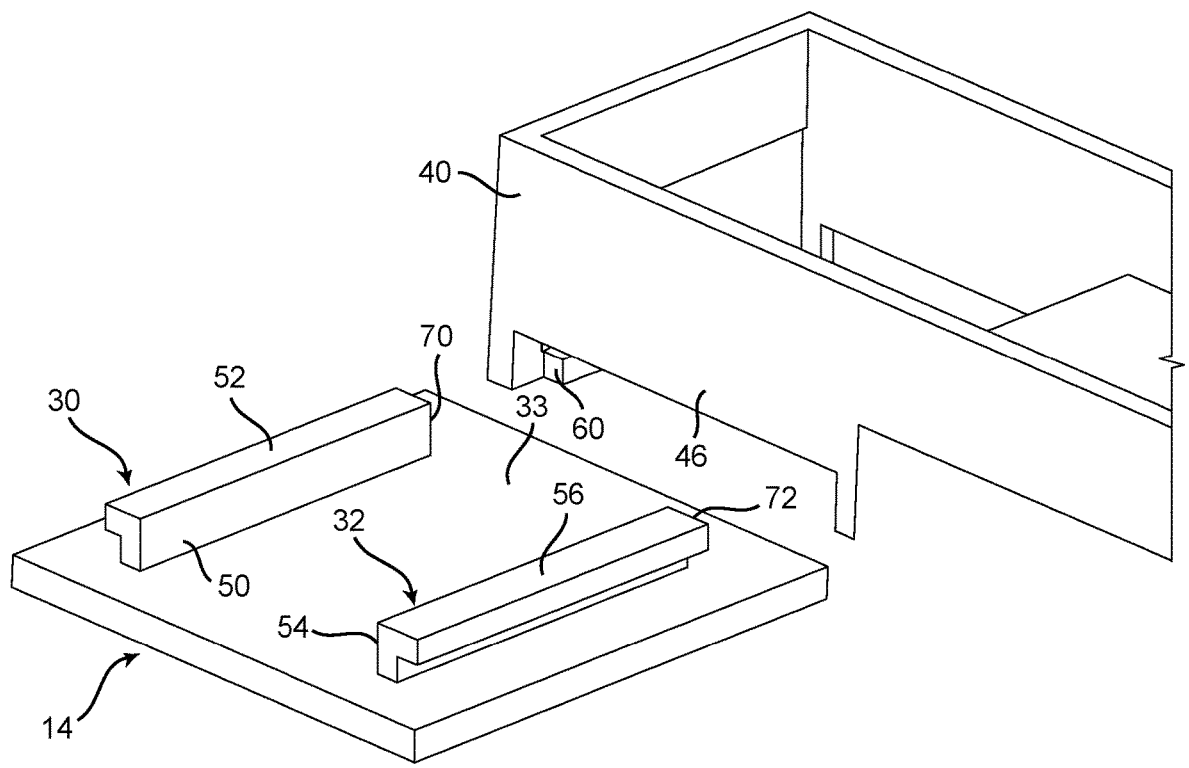
FIG. 5 is a diagram showing a lens and a base of the lamp assembly of FIG. 1 before the lens is inserted onto the base, according one embodiment.
Figure 6:
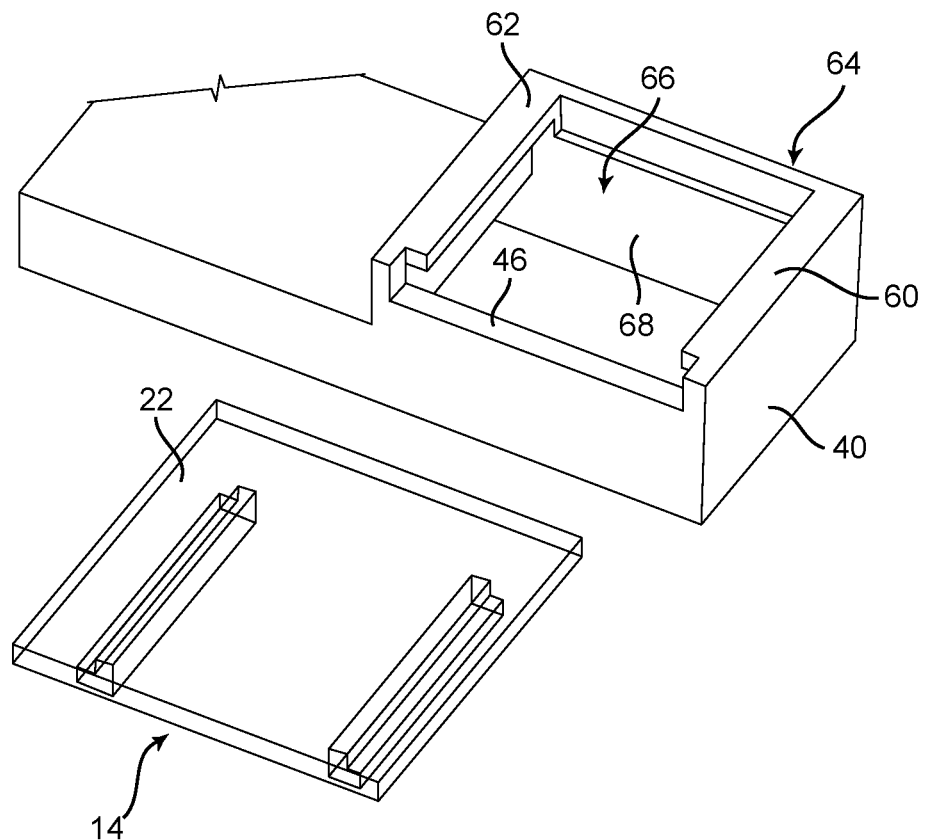
FIG. 6 is a diagram showing the lens and base of the lamp assembly of FIG. 1 from a bottom side perspective.

FIGS. 5 and 6 illustrate a top perspective view and a bottom perspective view, respectively, of the lens 14 before it is installed on the base 40 of the housing 12. When the lamp assembly 10 is being assembled according to various embodiments, the lens 14 is inserted onto the housing 12 first before the lid 38 can be closed over the base 40 and locked in place.

The first slide component 30 of the lens 14 includes a first riser 50 and a first ledge 52 and the second slide component 32 includes a second riser 54 and a second ledge 56. The combination of the first riser 50, the first ledge 52, and a portion of the inner surface 33 of the lens 14 underneath the first ledge 52 forms a first channel. This first channel is adapted to slide along a first rail 60 (see FIG. 5) of the base 40 along the x-axis. Also, the combination of the second riser 54, the second ledge 56, and a portion of the inner surface 33 of the lens 14 underneath the second ledge 56 forms a second channel. This second channel is adapted to slide along a second rail 62 (see FIG. 6) of the base 40 along the x-axis.

As shown in FIG. 6, a bottom portion of the base 40 includes a frame 64 having an opening 66 through which light from one or more light devices on the PCB 26 may radiate. With the lens 14 in place on the frame 64, the lens 14 may be adapted to refract light beams according to a predetermined pattern, depending on the design of the lens 14. The frame 64 may include the first rail 60 and the second rail 62 for allowing a slidable connection of the lens 14 with the base 40.

According to some embodiments, the base 40 may be constructed to include an abutment wall 68 on an opposite side of the base 40 from which the lens 14 can be inserted or removed from the rails 60, 62. The abutment wall 68 can thus limit the movement of the lens 14 when the first and second channels are aligned with the rails 60, 62 and the lens 14 is pushed onto the frame 64. Specifically, a first leading end 70 of the first slide component 30 and a second leading end 72 of the second slide component 32 are adapted to abut the abutment wall 68 when the lens 14 is fully inserted onto the frame 64. The portion of the abutment wall 68 that may contact the first and second leading ends 70, 72 of the first and second slide components 30, 32 may be defined in some embodiments as including part of the frame 64.

Figure 7:
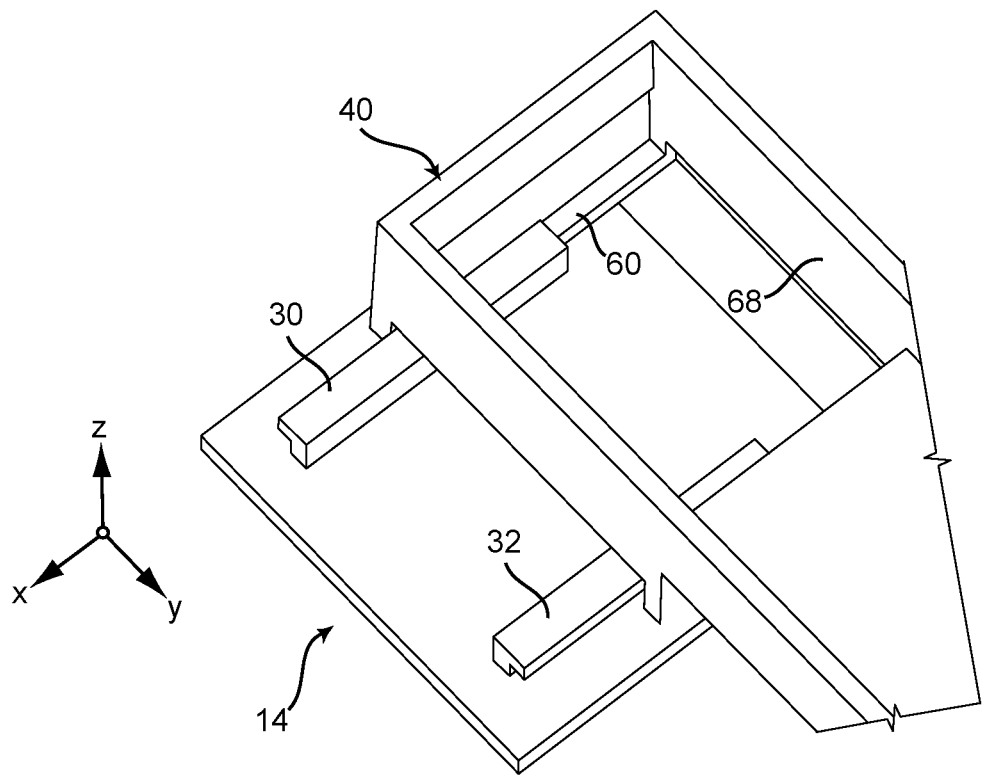
FIG. 7 is a diagram showing the lens being slid onto the base of the lamp assembly of FIG. 1, according to one embodiment.

FIG. 7 illustrates the lens 14 in the process of being installed on the base 40. As shown, the first slide component 30 is aligned with and is slid partially along the first rail 60 in the x-direction or substantially parallel with the x-axis. The second slide component 32 is aligned with and is slid partially along the second rail 62 (not shown in FIG. 7). In this embodiment, the lens 14 is positioned on the first and second rails 60, 62 from one side of the base 40 and is pushed toward the abutment wall 68 on the opposite side of the base 40.

In an alternative embodiment, the opposite side of the base 40 shown in FIG. 7 may be configured like the near side of the base 40, whereby the lens 14 can be installed from either direction. In this alternative embodiment, the lens 14 can be centered on the rails 60, 62 such that the opposing walls of the lid 38 can be pushed down over the base 40 and against the inner surface 33 of the lens 14 surrounding the slide components 30, 32 on both sides to thereby prevent the lens 14 from moving in the side to side direction (i.e., either direction along the x-axis).

Figure 8:
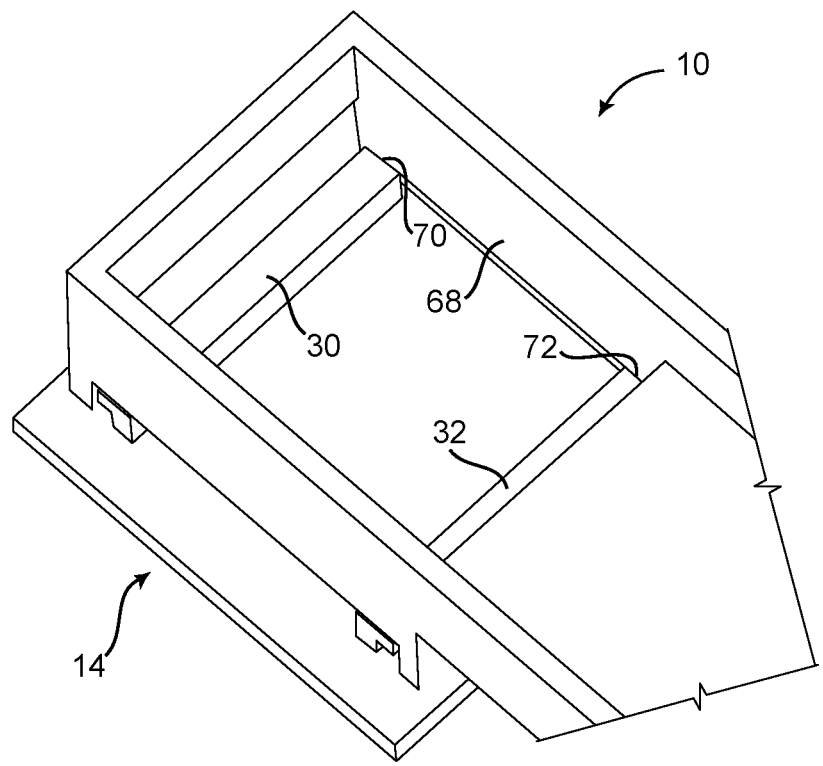
FIG. 8 is a diagram showing the lens fully inserted onto the base of the lamp assembly of FIG. 1, according to one embodiment.

FIG. 8 illustrates a portion of the lamp assembly 10 with the lens 14 fully inserted in the base 40. The lens 14 can be inserted such that at least one of the leading ends 70, 72 of the slide components 30, 32 contacts or abuts against the abutment wall 68 of the base 40.

Figure 9:
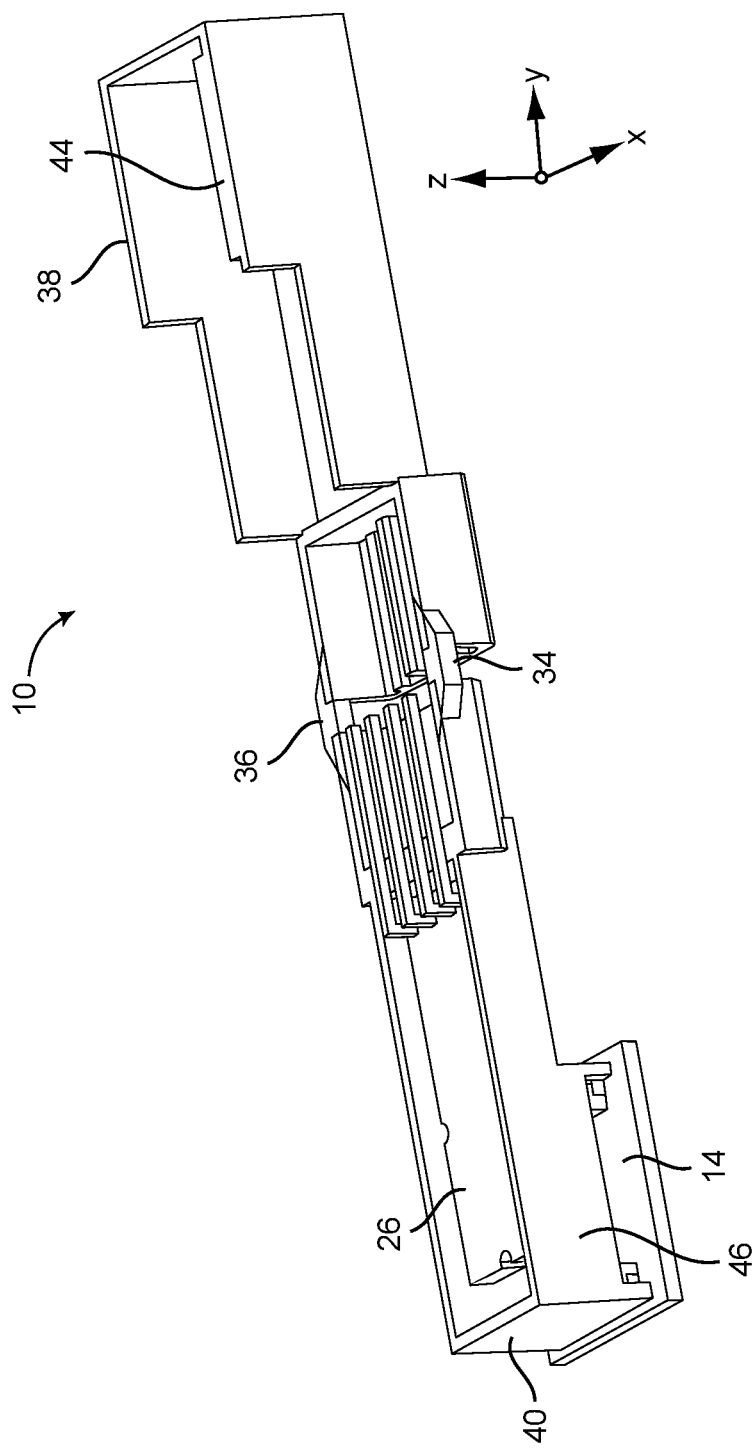
FIGS. 9-10 are diagrams showing different perspective views of a printed circuit board and lens installed on the lamp assembly of FIG. 1 before a lid is closed over a base of the housing, according to one embodiment.
Figure 10:
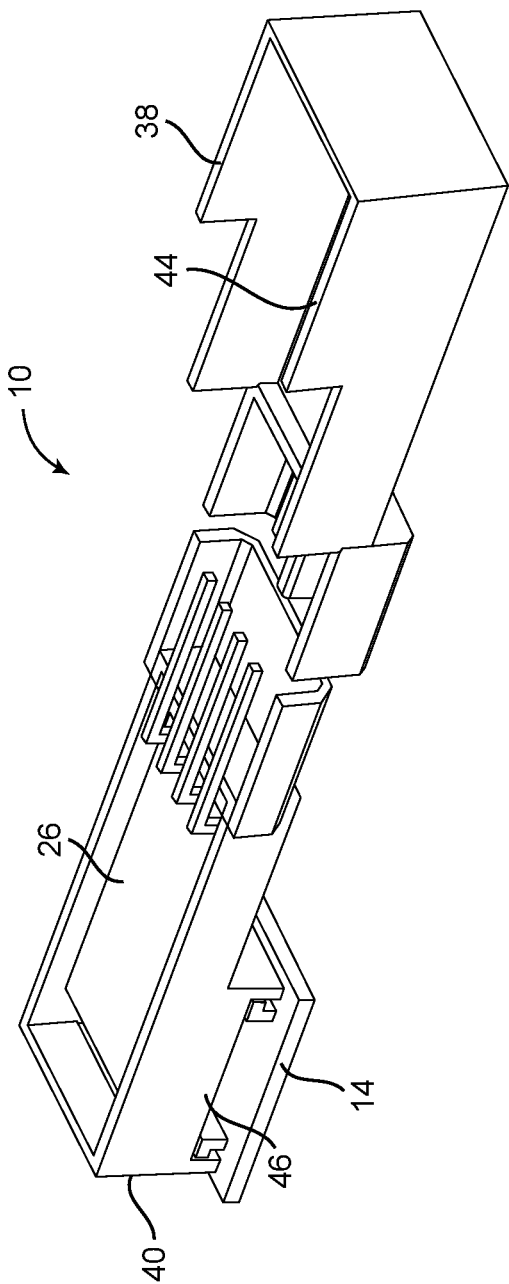

FIGS. 9-10 illustrate the lamp assembly 10 with the lens 14 fully inserted in frame 64 of the base 40 and the PCB 26 installed on the bottom surface 28 in the housing 12. Installation of the lens 14 and PCB 26 onto the housing 12 may be performed in any order. For example, during assembly, the lens 14 may be installed before the PCB 26 is installed, the PCB 26 may be installed before the lens 14 is installed, or the lens 14 and PCB 26 may be installed at the same time.

When the lens 14 and PCB 26 are properly positioned on the base 40, the lid 38 can be pivoted along the living hinges 34, 36 and snapped onto the base 40 by inserting the locking strip 44 of the lid 38 under the locking edge 46 of the base 40. As shown in FIG. 10, the lamp assembly 10 may be constructed without the living hinges 34, 36 or with a different type of pivoting mechanism. In some embodiments without the living hinges 34, 36, the lid 38 and base 40 of the housing 12 may be constructed as two separate pieces and may be snapped together using the locking strip 44 and locking edge and/or other connection components.

Figure 11:
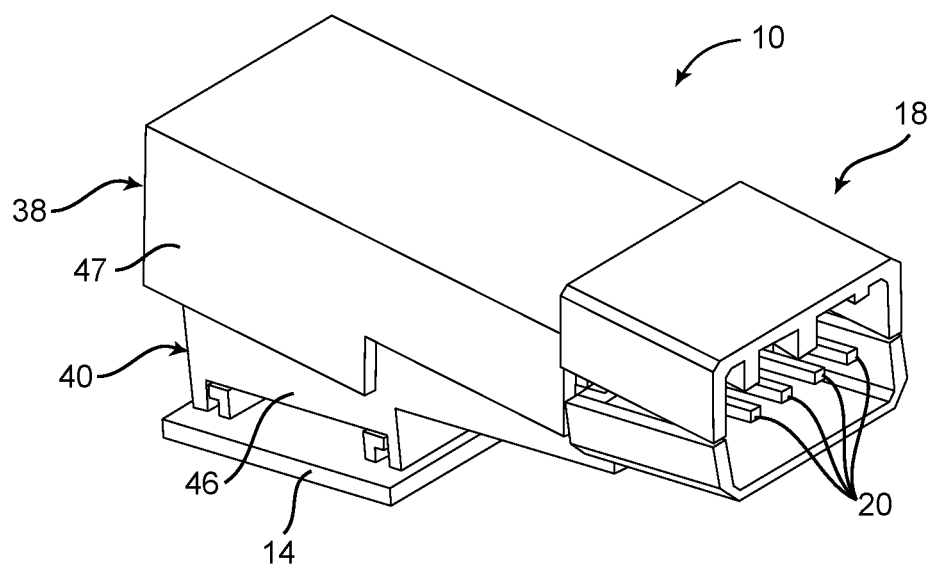
FIG. 11 is a diagram showing a perspective view of the lamp assembly of FIG. 1 showing the lid in the process of being closed over the base.

FIG. 11 shows the lid 38 being aligned with the base 40 such that the outer walls (e.g., wall 47) of the lid 38 encompass the outer walls of the base 40. Also, parts of the lid 38 and base 40 (shown at the front of the lamp assembly 10) form a shell or plug head member that defines the connector portion 18 of the lamp assembly 10. It may be noticed that the lens 14 as shown in FIG. 11 is positioned far enough within the frame 64 of the base 40 such that the wall 47 and/or locking strip 44 can be properly connected over the base 40. Otherwise, if the lens 14 is not installed properly, the lid 38 will not be able to close over the base 40 until the lens is properly repositioned.

Figure 12:
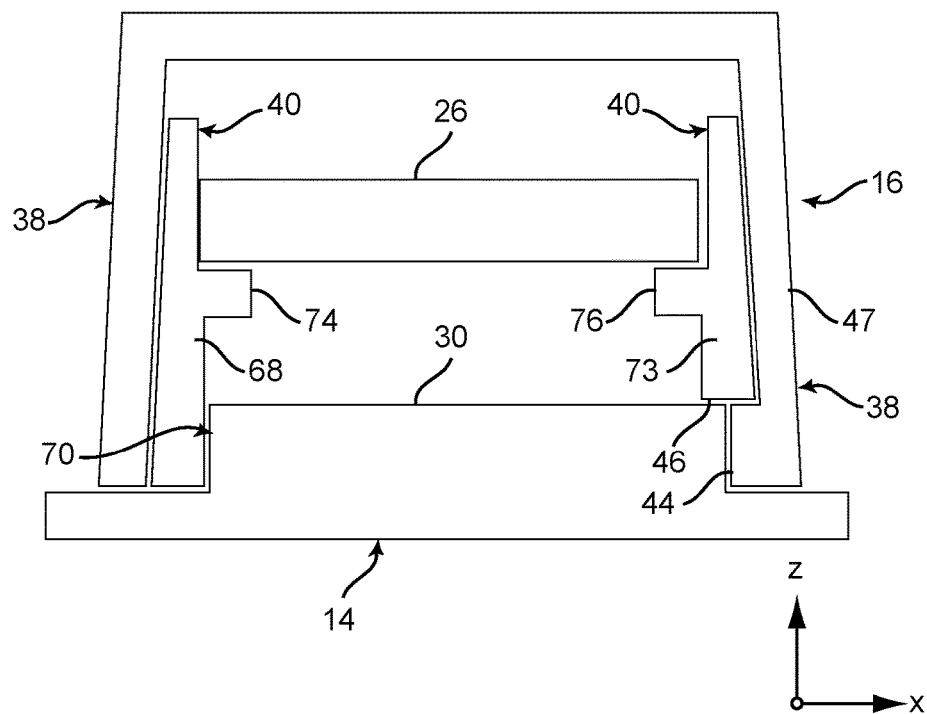
FIG. 12 is a diagram showing a cross-sectional view of a body portion of the lamp assembly of FIG. 1 in its completed form, according to one embodiment.

FIG. 12 is a cross-sectional view of the body portion 16 of the housing 12 of the lamp assembly 10, according to one embodiment, shown in FIG. 12 from a perspective in a direction parallel to or along the y-axis. The lamp assembly 10 is shown in its fully assembled state or completed form. As shown in FIG. 12, the lens 14 is installed on the base 40 such that the leading end 70 of the first slide component 30 is positioned against or near a bottom portion of the abutment wall 68 of the base 40. The base 40 is formed such that a side wall 73 is formed on an opposite side from the abutment wall 68. A bottom edge of the side wall 73 does not extend downward as low as the abutment wall 68. Thus, this arrangement of the side wall 73 allows sufficient clearance to enable the slide components 30, 32 of the lens 14 to slide underneath the bottom edge of the right side wall 73.

In an alternative embodiment, a bottom edge of the wall 68 may have a height that is substantially the same as the height of the bottom edge of the wall 73. In this alternative arrangement, the lens 14 can therefore be inserted onto the base 38 from either direction (e.g., from the right side of the drawing along the x-axis or from the left side of the drawing along the x-axis).

As further shown in FIG. 12, the walls of the lid 38 and base 40 may be angled slightly to allow the lid 38 to easily slide over the top of the base 40. Also, when the lid 38 is in the process of being closed over the top of the base 40, the locking strip 44 may be adapted to slide along the outside surface of the side wall 73 causing the wall 47 of the lid 38 to flex outward. During this closing process, the lid 38 is adapted to continue sliding onto the base 40 until the locking strip 44 clears the locking edge 46 of the base 40, at which point the lamp assembly 10 reaches its closed or completed state.

In addition, the abutment wall 68 in some embodiments may include a first tab, ledge, or strip 74 on an inner surface thereof and the side wall 73 may include a second tab, ledge, or strip 76 on an inner surface thereof. The tabs or strips 74, 76 may be adapted to be connected to the PCB 26 in a relatively fixed position and/or to simply provide additional support for the PCB 26. In other embodiments, the PCB 26 may be permanently or removably attached to the inside walls of the base 40 in any suitable manner, such as using adhesive materials and/or using connection components on the PCB 26 and/or base 40.

Figure 13:
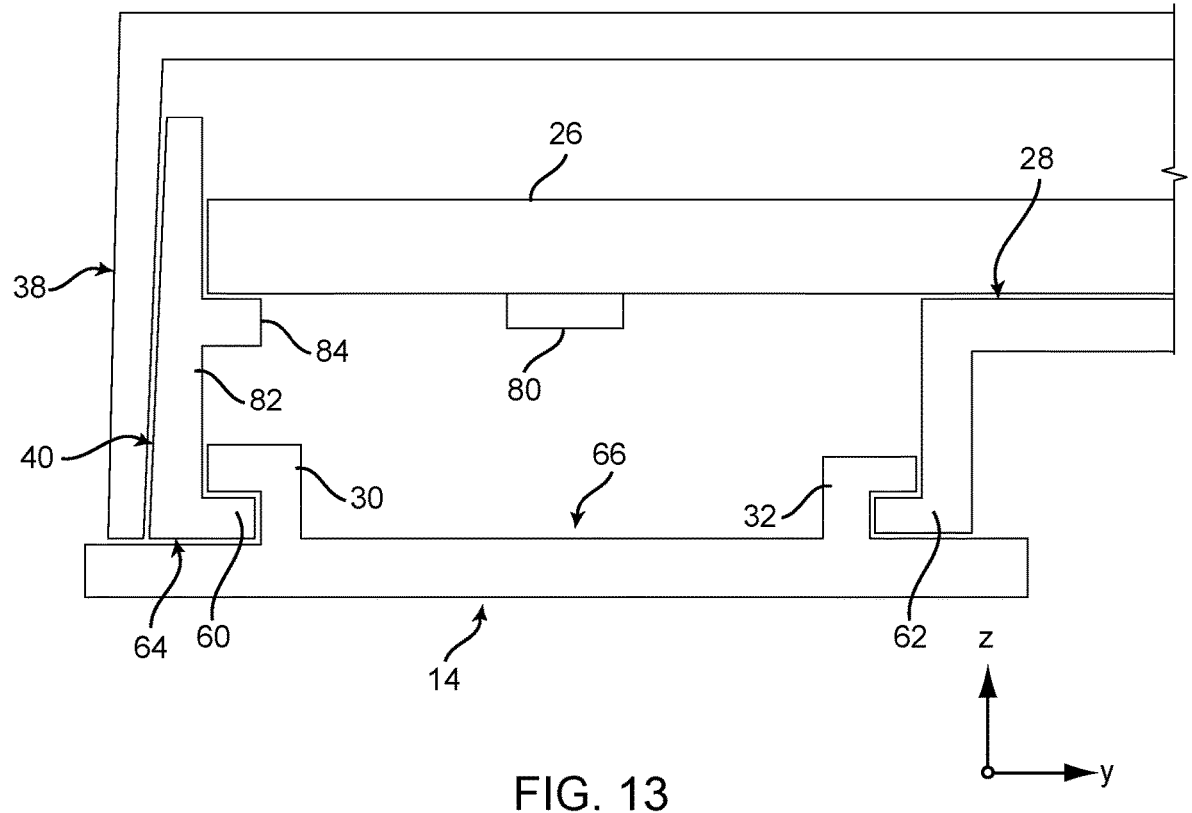
FIG. 13 is a diagram showing another cross-sectional view of the body portion of the lamp assembly of FIG. 1 in its completed form, according to one embodiment.

FIG. 13 is a cross-sectional side view of the lamp assembly 10 from a perspective along a direction along or parallel to the x-axis. The lamp assembly 10 is shown in FIG. 13 in its assembled state. Again, the walls of the lid 38 and base 40 may be slightly angled to allow the lid 38 to easily fit over the base 40.

The PCB 26 may include one or more lamps 80, LEDs, or other lighting components for radiating light through the opening 66 in the frame 64. A cross-section of the frame 64 shows the first rail 60 engaged with the first slide component 30 or first channel of the lens 14 and shows the second rail 62 engaged with the second slide component 32 or second channel. In some embodiments, a back wall 82 of the base 40 may include a third tab, ledge, or strip 84 on which the PCB 26 may be supported and/or connected. The PCB 26 may also be supported on the bottom surface 28 of the housing 12.

Therefore, according to various embodiments of lamp assemblies described in the present disclosure, the lamp assembly 10 may comprise the housing 12 having the frame 64, where the housing 12 may be adapted to at least partially cover a lamp 80 installed within the housing 12. Light radiating from the lamp 80 may be adapted to pass through the opening 66 in the frame 64. The lamp assembly 10 may further comprise the lens 14 adapted to be removably connected to the frame 64 of the housing 12. When connected to the housing 12, the lens 14 is adapted to refract, disperse, redirect, or focus the light radiating from the lamp 80 through the opening 66 in the frame 64. Also, when the lens 14 is connected to the frame 64 of the housing 12, a shortest path between the light device and the lens is defined by the z-axis. The lens 14 may further include one or more slide components (e.g., slide components 30, 32) to allow the lens 14 to slide onto the frame 64 along the x-axis that is perpendicular to the z-axis.

The one or more slide components 30, 32 may extend from a surface (e.g., inner surface 33) of the lens 14 facing an interior of the housing 12 when the lens 14 is connected to the frame 64 of the housing 12. The frame 64 of the housing 12 may include one or more rails (e.g., rails 60, 62) adapted to allow the one or more slide components 30, 32 of the lens 14 to slide onto the frame 64 along the x-axis. The one or more rails 60, 62 and the one or more slide components 30, 32 may be adapted to prevent the lens 14 from moving in a direction along the z-axis or along the y-axis that is perpendicular to both the x-axis and z-axis. Each of the slide components 30, 32 may comprise a riser (e.g., risers 50, 54) and a ledge (e.g., ledges 52, 56) adapted to engage with a respective rail (e.g., rails 60, 62) of the frame 64.

The housing 12 may include the lid 38 adapted to prevent the lens 14 from moving along the x-axis when the lens 14 is connected to the frame 64. The housing 12 further includes the base 40 and a living hinge (e.g., living hinges 34, 36), wherein the lid 38 is adapted to pivot about the living hinge 34, 36 to enable the lid 38 to cover at least a top portion and one or more side walls of the base 40. The base 40 may include the abutment wall 68 adapted to limit an extent to which the lens 14 can slide onto the frame 64. The lid 38 may include the locking strip 44 and the base 40 may include the locking edge 46, wherein the locking strip 44 may be adapted to engage with the locking edge 46 when the lid 38 covers the top portion and one or more side walls of the base 40.

The lamp assembly 10 may further comprise the printed circuit board 26 adapted to support the lamp 80. The base 38 may be adapted to support the printed circuit board 26 in such a way that the light radiating from the lamp 80 passes through the opening 66 in the frame 64 and through the lens 14. The printed circuit board 26 may be further adapted to support one or more electrical leads 20. The housing 12 may further include the connector 18 adapted for connection with an electrical plug for providing power to the lamp 80, wherein the connector 18 may be adapted to shield the one or more electrical leads 20.

The present disclosure is also directed to a lens (e.g., the lens 14) that can be manufactured such that it is adapted for connection to the housing 12 of the lamp assembly 10. For example, in one embodiment, the lens 14 may comprise a refraction element (e.g., characteristics of the outer surface 22 and/or inner surface 33 of the lens 14) adapted for dispersing, refracting, or focusing light radiating from the lamp 80 installed in the housing 12 of the lamp assembly 10. The refraction element 22, 33 may be substantially oriented within a plane defined by the x-axis and the y-axis, whereby a shortest path between the lamp 80 and the plane is defined by the z-axis perpendicular to the x-axis and the y-axis. The lens 14 may further comprise one or more connection elements (e.g., the first and second slide components 30, 32) adapted to enable the lens 14 to be removably connected to the housing 12 of the lamp assembly 10 by moving the lens 14 in a connecting direction (e.g., along the x-axis) substantially within or parallel to the plane (e.g., the plane defined by the x-axis and y-axis).

Furthermore, the lens 14 may be adapted such that the one or more connection elements may include first and second slide components 30, 32 adapted to enable the lens 14 to slide into engagement with one or more corresponding rails 60, 62 of the housing 12 of the lamp assembly 10. The first and second slide components 30, 32 may extend from a first surface (e.g., inner surface 33) of the refraction element facing an interior of the housing 12 and may be arranged in a direction (e.g., along the x-axis) parallel to the plane (e.g., the plane defined by the x-axis and y-axis). When connected to the housing 12, movement of the lens 14 in the connecting direction may be limited by the lid 38 of the housing 12. The one or more connection elements 30, 32 may include one or more leading edges 70, 72 adapted to abut the abutment wall 68 of the housing 12 when the lens 14 is connected to the housing 12 of the lamp assembly 10.

The embodiments of the lamp assemblies described in the present disclosure are able to overcome some of the issues of the conventional lamp assemblies. For example, the risk that the lens 14 will fall off has been eliminated by the present lamp assemblies because the lens 14 is confined within the housing 12 and the movement of the lens 14 is limited by at least the wall 47 of the lid 38. The rails 60, 62 and sliding components 30, 32 restrict movement of the lens 14 to only the x-direction along the x-axis. When the lid 38 is pivoted 180 degrees and locked onto the base 40, the lid 38 restrict the x-direction movement, thereby preventing the lens 14 from moving any significant distance in any direction and keeping the lens 14 in place on the housing 12.

Thus, the lens 14 of the present lamp assemblies cannot simply snap off unintentionally. When the lamp assembly 10 is assembled and placed in position within the vehicle, the risk that the lens 14 could fall off is essentially eliminated. Another advantage of the present embodiments is that when the lens 14 is properly installed in the housing 12 and the housing 12 is in its closed position, thereby locking the lens 14 in place, the optics or refractive characteristics of the lens 14 will be correctly oriented according to its intended design, because the housing 12 can only be closed if the lens 14 is in the correct position within the housing 12.

Although the present disclosure describes lamp assemblies for use as interior lights for illuminating interior spaces within a vehicle, the embodiments described herein may also be applicable to exterior lights, which may include various types of signal indicators located on the exterior of the vehicle. For example, the exterior signal indicators may include turn signals, brake lights, reverse indicator lights, tailgate lights, ground lights, etc. Some of these lights may be used to allow the driver to signal to other drivers his or her intentions or actions. Lenses of exterior lamp assemblies may be connected to corresponding exterior housings of the lamp assemblies in a similar manner as described above with respect to the interior lamp assemblies. Therefore, the lamp assemblies described herein may also refer to exterior lighting systems.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. A lamp assembly for use in a vehicle, the lamp assembly comprising:
    a housing having a frame, the housing adapted to at least partially enclose a light device installed within the housing, whereby light radiating from the light device passes through an opening in the frame; and
    a lens adapted to be removably connected to the frame of the housing, such that, when connected to the housing, the lens is adapted to refract the light radiating from the light device through the opening in the frame, whereby, when the lens is connected to the frame of the housing, a shortest path between the light device and the lens is defined by a z-axis, the lens including one or more slide components adapted to allow the lens to slide into or onto the frame along an x-axis that is perpendicular to the z-axis;
    wherein the housing includes a lid adapted to be disposed about at least a portion of the frame and the one or more slide components and adjacent to a surface of the lens facing an interior of the housing and prevent the lens from moving along the x-axis when the lens is connected to the frame.

2. The lamp assembly of claim 1, wherein the one or more slide components extend from the surface of the lens facing an interior of the housing when the lens is connected to the frame of the housing.

3. The lamp assembly of claim 1, wherein the frame of the housing includes one or more rails adapted to allow the one or more slide components of the lens to slide into or onto the frame along the x-axis.

4. The lamp assembly of claim 3, wherein the one or more rails and the one or more slide components are adapted to prevent the lens from moving in a direction along the z-axis or along a y-axis that is perpendicular to both the x-axis and z-axis.

5. The lamp assembly of claim 3, wherein the frame of the housing includes two rails and the lens includes two slide components.

6. The lamp assembly of claim 3, wherein each of the one or more slide components comprises a riser and a ledge adapted to engage with one of the one or more rails of the frame.

7. The lamp assembly of claim 1, wherein the housing further includes a base and a living hinge, and wherein the lid is adapted to pivot about the living hinge to enable the lid to cover at least a top portion and one or more side walls of the base.

8. The lamp assembly of claim 7, wherein the base includes an abutment wall adapted to limit an extent to which the lens can slide onto the frame.

9. The lamp assembly of claim 7, wherein the lid includes a locking strip and the base includes a locking edge, and wherein the locking strip is adapted to engage with the locking edge when the lid covers the top portion and one or more side walls of the base.

10. The lamp assembly of claim 7, further comprising a printed circuit board adapted to support the light device, wherein the base is adapted to support the printed circuit board in such a way that the light radiating from the light device passes through the opening in the frame and through the lens.

11. The lamp assembly of claim 10, wherein the printed circuit board is further adapted to support one or more electrical leads.

12. The lamp assembly of claim 11, wherein the housing further includes a connector adapted for connection with an electrical plug for providing power to the light device, and wherein the connector is adapted to shield the one or more electrical leads.

13. A lens adapted for connection to a housing of a lamp assembly for use in a vehicle, the lens comprising:
   a refraction element adapted for refracting light radiating from a light device installed in the housing of the lamp assembly, the refraction element oriented within a plane defined by an x-axis and a y-axis, whereby a shortest path between the light device and the plane is defined by a z-axis perpendicular to the x-axis and the y-axis; and
   one or more connection elements extending from an interior portion away from edges of a first surface of the refraction element facing an interior of the housing and adapted to enable the lens to be removably connected to the housing of the lamp assembly by moving the lens in a connecting direction substantially within or parallel to the plane defined by the x-axis and y-axis.

14. The lens of claim 13, wherein the one or more connection elements include first and second slide components adapted to enable the lens to slide into engagement with one or more corresponding rails of the housing of the lamp assembly.

15. The lens of claim 14, wherein the first and second slide components are arranged in a direction parallel to the plane.

16. The lens of claim 13, wherein, when the lens is connected to the housing, movement of the lens in the connecting direction is limited by a lid of the housing.

17. The lens of claim 13, wherein the one or more connection elements include one or more leading edges adapted to abut an abutment wall of the housing when the lens is connected to the housing of the lamp assembly.

18. The lamp assembly of claim 1, wherein the lens has a width that is greater than a length of the one or more slide components and a width of the opening in the frame.

19. The lamp assembly of claim 1, wherein the lens has a length that is greater than a length of the opening in the frame.

20. The lens of claim 13, wherein the refraction element has a width that is greater than a length of the one or more connection elements and a width of the housing of the lamp assembly.

* * * * *